April 12, 1932. D. E. BICKNELL 1,853,193
BLOWTORCH NOZZLE
Filed Feb. 15, 1929

Inventor
D. E. Bicknell
By Arthur F. Durand
Attys

Patented Apr. 12, 1932

1,853,193

UNITED STATES PATENT OFFICE

DELOSSE E. BICKNELL, OF ST. JOSEPH, MICHIGAN

BLOWTORCH NOZZLE

Application filed February 15, 1929. Serial No. 340,052.

This invention relates to blow torches, and more particularly to the nozzle thereof. Ordinarily, blow torches of this kind have a straight nozzle from which the flame is projected in a straight line. One difficulty with such a blow torch is that, in case of wind, the flame is sometimes blown back into the nozzle, causing interference with the work.

Generally stated, therefore, the object of the invention is to provide a deflector for the nozzle of a blow torch, adapted to shield the end of the nozzle and the flame against the wind, so that the flame can be directed against the work without danger of being blown back into the nozzle.

Another object is to provide a deflector which can also be used as a support for a soldering iron, when it is desired to heat a soldering iron on the blow torch.

It is also an object to provide certain details and features of construction and combinations tending to increase the general efficiency and the desirability of a blow torch deflector of this particular character.

To the foregoing and other useful ends, the invention consists in the matters hereinafter set forth and claimed, and shown in the accompanying drawings, in which,—

Figure 1:
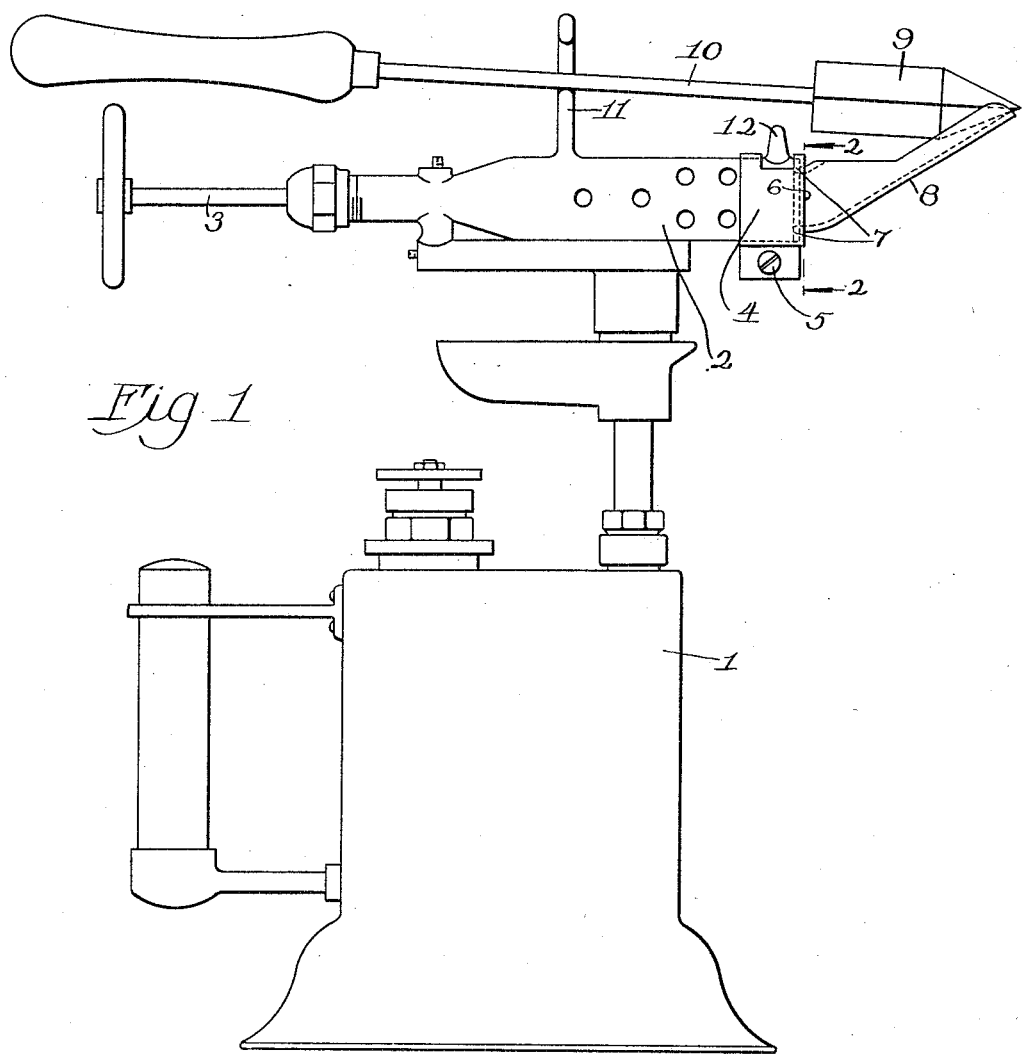
Fig. 1 is a side elevation of a blow torch provided with a nozzle deflector embodying the principles of the invention, showing the deflector in position for use as a support for the head of a soldering iron.

As thus illustrated, the blow torch 1 may be of any suitable known or approved character, and is provided with the usual or ordinary mixing nozzle 2 at the top thereof. A handle 3 controls the escape of the fuel, in the usual and well known manner, so that a hot flame is blown or projected straight out from the end of the nozzle, under ordinary conditions.

In the present case, however, said nozzle is provided with a split ring or collar 4 having a tightening screw 5 by which the ring is clamped on the end portion of the nozzle. The outer annular edge portion of the ring 4 is provided with a flange 6 forming a seat for the annular flange 7 of the tubular deflector 8, whereby this deflector may be clamped in position, as shown. The body portion of said deflector is preferably straight, and is concave in cross section on its inner side, so as to form a channel for the flame. By loosening the bolt 5, the deflector can be rotated to any desired position, at the same obtuse angle to the nozzle, and then clamped in such position. The outer end portion of the deflector is thus open at one side, being semi-tubular here, while its inner end portion is tubular, as shown. Thus the straight flame is merely caused to change its direction, without spreading or changing the character of the flame, whereby the flame is maintained in the form necessary for ordinary blow torch work.

Figures 2, 3:
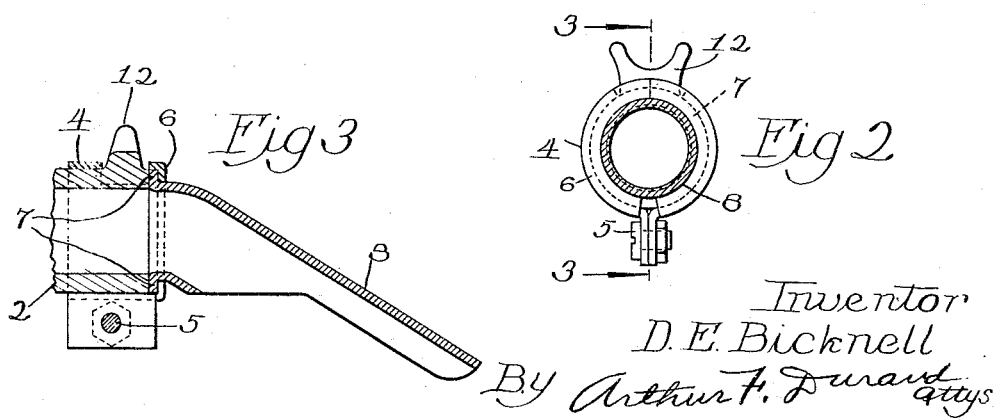
Fig. 2 is a detail vertical transverse section on line 2—2 in Fig. 1, on a larger scale.
Fig. 3 is a longitudinal vertical section on line 3—3 in Fig. 2.

As shown in Fig. 3 of the drawings, the deflector 8 is in position to deflect the flame downwardly upon the work, and to shield the end of the nozzle and a portion of the flame against the wind, so that the wind, when the torch is held in certain positions, is prevented from blowing the flame back into the nozzle. The deflector becomes very hot and tends to keep the gas ignited, even in the wind. It does not spread the flame, or change its form, but simply changes its direction, and protects it against wind, so that the flame is still straight and direct and may be used on any desired work for ordinary blow torch purposes.

As shown in Fig. 1 of the drawings, the deflector 8 has been adjusted into an upturned position, thereby forming a support for the head 9 on the rod 10 of a soldering iron. Ordinarily, without the deflector 8, the rod 10 would rest in the two supports 11 and 12 ordinarily provided on blow torches of this kind. However, with the deflector 8 adjusted in position as shown, the head 9 of the soldering iron can rest thereon, and will be directly in the path of the flame, thereby heating the soldering iron more effectively.

Thus an adjustable deflector is provided for the end of the blow torch nozzle, which can be used to guard the flame and prevent interference with the work, when the torch is used in the wind, and, in addition, as a secondary use, the deflector can be used to support and more effectively heat the head of a soldering iron.

As shown, the deflector is in the nature of an attachment for blow torches already constructed and on the market, but it is obvious that this deflector attachment can be incorporated in the structure of the blow torch, at the factory, in any suitable or desired manner, if so desired. On the other hand, the deflector can be made and sold as a separate attachment, to be purchased by the user and applied to an already constructed blow torch.

The outer portion 8 is substantially U-shaped in cross-section, it will be observed, and by this is meant that it is concave on its inner side and convex on its outer side, whereby this portion takes the form of a trough or channel to guide or direct the flame.

What I claim as my invention is:

1. In combination with a blow torch nozzle, a deflector comprising a tubular inner portion on which is formed an outwardly extending peripheral flange and a straight outer portion of substantially U-shaped cross section forming a continuation of the said tubular portion and disposed at an acute angle to the axis of the said nozzle, and means coacting with the said tubular portion to form a swivel connection between the deflector and the nozzle whereby the deflector is rotatably adjustable on the nozzle.

2. A structure as specified in claim 1, comprising means on the torch nozzle to co-operate with said deflector to support a soldering iron in the flame of the torch when the said deflector is adjusted to extend upwardly.

Specification signed Jan. 29, 1929.

DELOSSE E. BICKNELL.